Oct. 18, 1927.

E. COENEN 1,645,895

PROCESS OF MAKING FILES

Filed March 6, 1924

Inventor
E. Coenen
by Langner, Parry, Card & Langner
Attys.

Patented Oct. 18, 1927.

1,645,895

UNITED STATES PATENT OFFICE.

EDOUARD COENEN, OF BRUSSELS, BELGIUM.

PROCESS OF MAKING FILES.

Application filed March 6, 1924, Serial No. 697,333, and in Belgium January 14, 1924.

This invention has for its object to provide an improved process for the manufacture of files of the type composed of a plurality of file blades arranged side by side and fastened together.

In the known files constructed on this principle the fastening together of the file blades is effected by mechanical means. The blades are mounted side by side on a central support or bar and are held in place by nuts or other clamping devices. It has already been proposed for the same purpose to clamp the blades in a frame or holder with the use of similar fastening means. All those constructions have however the drawback that they do not assure a sufficient degree of rigidity of the file as a whole in working because the several blades have a tendency to move relatively to one another. Further, the supports and the fastening devices are generally of complicated form and increase considerably the weight of the files, while presenting certain difficulties as regards labor, and the manipulations of the files.

It has already been proposed to connect the individual file and blades with a supporting element by means of welding.

The proximity of the individual blades, however, prevents complete welding. As a result the blades only withstand large stresses with difficulty and fractures are ever to be feared. If, on the other hand, the individual blades be removed so as to facilitate the welding, such file may be particularly adapted for use for special purposes, as for example, for sharpening swords, while being quite unfit for use for finer work.

The purpose of this invention is to overcome these defects by a new method of manufacture, in which the individual file blades are connected together by fusion welding, thus providing a rigidity which is not inferior to that of ordinary files made of one piece material; and this is done by arranging the file blades in a frame and connecting the individual blades together by a fusion welding process, whereby the fusing in material connecting the blades also forms the body of the file.

The tang for receiving the wooden handle of the file may be fixed to the blades during the same fusion welding operation, or afterwards.

The fusion welding operation may be effected with advantage by means of extraneous metal spread in a molten state upon the backs of the blades to be assembled. This layer of metal when cooled will constitute a solid base which serves as a connecting element between the several blades of the file. In this case the blades may be arranged more or less closely together. Further, the invention allows of producing files of comparatively great width which are subsequently sawn or separated in the direction of their length for the purpose of obtaining from one wide file a plurality of files of lesser width.

Other advantages of the improved file according to this invention will be perceived from the following description with reference to the accompanying drawings which illustrate by way of example a constructional form of this invention.

The file blades 1 which are fusion welded together are cut to the desired lengths from a steel bar having a cross-section corresponding to that of the blades when ready for use.

The file blades have preferably an operative face 2 comprising vertical grooves. The adjacent operating face 3 is inclined so that the contact edge shall have the form of a saw-tooth or planing cutter.

In the illustrated example the file blades are arranged at an angle of about 30° to the longitudinal axis of the file so that all the cross sections of the file shall intersect the same number of file blades. This arrangement enables the improved file to have a regular cutting action upon metal parts, even in the case where the latter are of small thickness, without producing jolts or stoppages during the operation, because the number of bearing points of the file is always the same.

Figure 1:
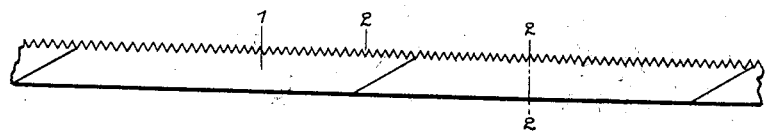
Fig. 1 illustrates a metal bar that is cut-up to form the blades.
Figure 2:
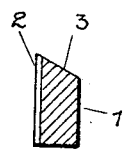
Fig. 2 is a cross section of this bar taken on line 2—2 of Fig. 1.
Figure 3:
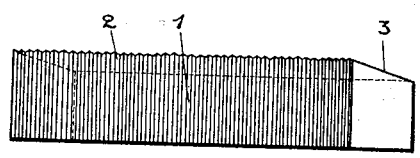
Fig. 3 is a perspective view of one of the file blades ready for fusion welding.
Figure 4:
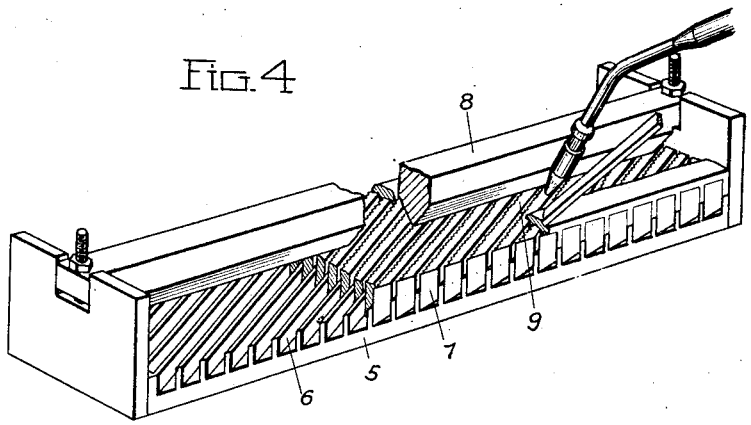
Fig. 4 is a perspective view of the mold in which the file blades are fusion welded together.
Figure 5:
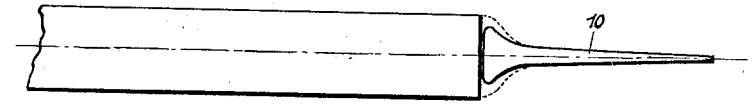
Fig. 5 illustrates one of the ways of attaching the tang to the file.
Figure 6:
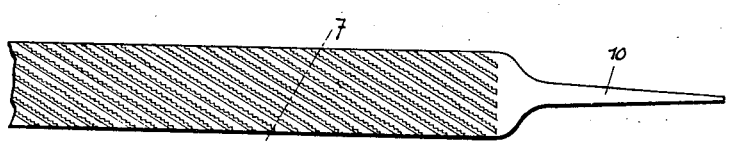
Fig. 6 is a bottom view of the improved file after the fusion welding operation.
Figure 7:
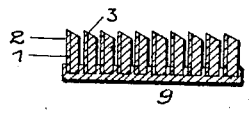
Fig. 7 is a vertical cross-section of the file taken on line 7—7 of Fig. 6, at right angles to the grooves.

Figs. 4 and 5 illustrate one of the processes of manufacture of the improved file of this invention.

The support comprises a part 5 formed with vertical grooves 6 in which file blades 1 are inserted. These grooves make with the longitudinal axis of the support the same angle as the blades make with the major axis of the finished file.

The blades are held in position during the fusion welding operation, by means of a removable clamping bar 8 having a cross-section which diminishes towards the lower edge that bears upon the upper faces of the blades.

The blades are fusion welded by autogenous or other process, first along the side edges of the upper faces of the blades placed upon the support. The extraneous metal fills the cavities left between the upper portions of the blades and then spreads over the backs of the latter. Then the bar 8 is removed, and the central portion 9 is filled with the fusing in metal. The file is then machined on its side surfaces so as to assume the form shown in Fig. 5.

The tang 10 constituted by a piece of metal of suitable shape is then connected by fusion welding to the end of the file, the connection being effected by means of extraneous metal. After this operation the file is hardened and ready for use.

It is obvious that a tang or tangs 10 may be arranged on the support together with the blades, so that the whole can be fusion welded at one and the same time.

By this means, the improved file is made in one piece and the blades have grooves between them of great depth, thereby enabling the file to be sharpened several times. The sharpening is effected when the operative faces 3 of the blades have become worn, without it being necessary to recut the teeth of the faces 2.

The improved process allows of producing in a single mold, files of comparatively great width, and these files can be sawn in the direction of the length of the edges of desired widths which may be very small, in fact, so small as to produce a file having a shape approximating that of a metal-cutting saw.

What I claim as my invention and desire to secure by Letters Patent is:

1. A process for the manufacture of files, comprising arranging a plurality of file blades side by side on a support, and then connecting the blades together by fusion welding so as to provide a file formed in one piece whereof the fusing in metal forms the body of the file, the fusion welding being performed first along the two sides of the supporting member, and then, after removal of the supporting member, on the surface that was covered by such member.

2. A process for the manufacture of files, comprising arranging a plurality of file blades side by side on a support together with the metal which is to constitute the tang of the finished file, and then connecting together the various parts by fusion welding so as to provide a file formed in one piece whereof the fusing in metal forms the body of the file, the fusion welding being performed first along the two sides of the supporting member, and then, after removal of the supporting member, on the surface that was covered by such member.

3. A process for the manufacture of files, comprising arranging a plurality of file blades side by side on a support, and then connecting the blades together by fusion welding so as to provide a file formed in one piece whereof the fusing in metal forms the body of the file, the support having a bottom containing vertical grooves into which the file blades are inserted, and a supporting member for holding the blades in position until the several file blades are connected together by the fusion welding, the fusion welding being performed first along the two sides of the supporting member, and then, after removal of the supporting member, on the surface that was covered by such member.

4. A process for the manufacture of files, comprising arranging a plurality of file blades side by side on a support together with the metal which is to constitute the tang of the finished file, and then connecting together the various parts by fushion welding so as to provide a file formed in one piece whereof the fusing in metal forms the body of the file, the support having a bottom containing vertical grooves into which the file blades are inserted, and a supporting member for holding the blades in position until the several file blades are connected together by the fusion welding, the fusion welding being performed first along the two sides of the supporting member, and then, after removal of the supporting member, on the surface that was covered by such member.

In testimony whereof I affix my signature.

EDOUARD COENEN.